Jan. 28, 1964 E. J. ESSWEIN, JR 3,119,712
SANITARY CAN COATING COMPOSITION COMPRISING A BLEND
OF VINYL CHLORIDE COPOLYMERS AND
ARTICLE COATED THEREWITH
Filed Feb. 29, 1960

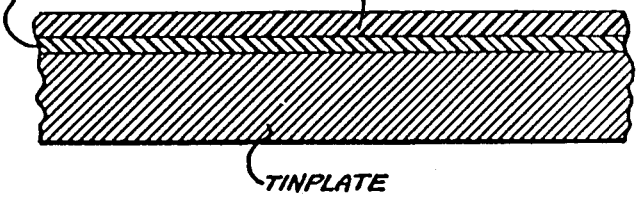

TOPCOAT COMPRISING
(A) COPOLYMER OF 55-75% OF VINYL CHLORIDE, BALANCE ESSENTIALLY DIESTER OF UNSATURATED DICARBOXYLIC ACID (B) COPOLYMER OF 55-75% OF VINYL CHLORIDE, 14-35% OF DIESTER OF UNSATURATED DICARBOXYLIC ACID AND 5-10% OF MONOHYDROGEN MONOESTER OF UNSATURATED DICARBOXYLIC ACID

BAKED OLEORESINOUS VARNISH PRIMER

TINPLATE

INVENTOR
*Edward J. Esswein, Jr.*

BY
*Schneider, Dressler, Goldsmith & Clement*
ATTORNEYS

United States Patent Office 3,119,712
Patented Jan. 28, 1964

3,119,712
SANITARY CAN COATING COMPOSITION COM-
PRISING A BLEND OF VINYL CHLORIDE CO-
POLYMERS AND ARTICLE COATED THERE-
WITH
Edward J. Esswein, Jr., Pittsburgh, Pa., assignor, by
mesne assignments, to Mobil Finishes Company, Inc.,
New York, N.Y., a corporation of Delaware
Filed Feb. 29, 1960, Ser. No. 11,435
13 Claims. (Cl. 117—75)

The present invention relates to sanitary can coating compositions and particularly to coatings for the interior of beer cans which can be applied from essentially aromatic hydrocarbon solvent solutions of high resin solids content to provide adherent coatings resistant to elevated temperature pasteurizing treatments. The invention includes coatings resistant to extensive fabrication such as is encountered in the deformation of coated stock to form can ends.

In accordance with the invention certain aromatic hydrocarbon-soluble copolymers of 55–75% of vinyl halide, typically vinyl chloride, with the balance of the copolymer consisting essentially of di-saturated hydrocarbon ester of acid from the group of maleic, fumaric and chloromaleic acids and mixtures thereof, said esters containing 6–24 carbon atoms, are blended with certain aromatic hydrocarbon-soluble copolymers of 55–75% of vinyl halide, typically vinyl chloride, with from 14–35% of dihydrocarbon ester as above defined and from 5–10% of monohydrogen mono-saturated hydrocarbon ester of acid from the group of maleic, fumaric and chloromaleic acids and mixtures thereof, said monohydrocarbon esters containing 5–14 carbon atoms, to provide coatings which adhere well to metal surfaces and especially to primed and unprimed tin surfaces and which possess reasonably satisfactory resistance to elevated temperature pasteurizing treatments while in contact with aqueous mediums such as water or beer.

A drawing with legends is presented to facilitate rapid understanding of the products produced in accordance with the invention.

In accordance with a feature of the invention, the above defined copolymer blends are further improved to better resist aqueous mediums and also to accommodate extensive deformation permitting fabrication of can ends without crazing or microfracturing of the coating by incorporation of a minor proportion of epoxidized unsaturated fatty acid triglycerides.

The aromatic hydrocarbon-soluble copolymers of 55–75% of vinyl chloride with the balance of the copolymer consisting essentially of di-saturated hydrocarbon ester of acid from the group of maleic, fumaric and chloromaleic acids and mixtures thereof, said esters containing 6–24 carbon atoms, which are employed in the invention are characterized by complete solubility in toluene at 25% solids and by a relative viscosity measured at 20° C. in 1% cyclohexanone of from 1.3–1.7. To facilitate providing the desired low molecular weight, the monomers constituting the copolymer may be polymerized in the presence of from about 1 to about 6.5% of a saturated halogenated hydrocarbon or an ethylenically unsaturated halogenated hydrocarbon which is not readily copolymerized with vinyl chloride, but this is not essential. A particularly preferred copolymer falling within this class is a copolymer prepared by aqueous emulsion polymerization in the presence of 1% by weight, based on the total weight of monomers, of ammonium persulfate and containing 70 parts of vinyl chloride copolymerized with about 30 parts of a commercial mixture of substantially equal parts of n-dibutyl maleate and n-dibutyl fumarate. This copolymer has a relative viscosity measured at 20° C. in cyclohexanone of 1.45 and is referred to hereinafter as copolymer "A."

The aromatic hydrocarbon-soluble copolymer of 55–75% of vinyl chloride with 14–35% of di-saturated hydrocarbon ester of acid from the group of maleic, fumaric and chloromaleic acids and mixtures thereof, said esters containing 6–24 carbon atoms, and from 5–10% of monohydrogen mono-saturated hydrocarbon ester of acid from the group of maleic, fumaric and chloromaleic acids and mixtures thereof, said mono esters containing 5–14 carbon atoms, are characterized by complete solubility in a 90/10 mixture of toluene and methyl ethyl ketone at 25% solids and by a relative viscosity measured at 20° C. in 1% solution of cyclohexanone of from 1.2–1.6. Again, and to facilitate obtaining the low molecular weight copolymers which are desired, the copolymerization may be conducted in the presence of from 1–6.5% of a saturated halogenated hydrocarbon or an ethylenically unsaturated halogenated hydrocarbon which is not readily copolymerized with vinyl chloride, but this is not essential.

Copolymers of the type under consideration and which may be used in accordance with the invention are disclosed in the United States patents to Rowland and Piloni Re. 24,206; 2,849,422; 2,849,423 and 2,849,424. A copolymer which contains vinyl chloride/commercial n-dibutyl maleate mixture/mono-n-butyl monohydrogen maleate in weight proportions of 70/20.7/8.3 and has a relative viscosity mensured at 20° C. in 1% cyclohexanone solution of 1.35 is particularly preferred, this copolymer being hereinafter referred to as copolymer "B."

Copolymers of the type exemplified by copolymer A are not well adapted for sanitary can coatings because they do not adhere well to electrolytic tin plate (whether primed or unprimed) and coatings of these copolymers possess only marginal resistance to blush when subjected to pasteurization conditions (exposure to water for 45 minutes at 170° F.). The lack of adhesion is particularly evidenced when the copolymers exemplified by copolymer A are applied over baked oleoresinous phenol-aldehyde primers.

Copolymers represented by copolymer B are also inadequate for sanitary can use because coatings of these copolymers exhibit poor resistance to blush when pasteurized under the conditions set forth above.

In addition to the inadequacies pointed to above, the individual copolymers are not well adapted to provide films which resist fabrication into can ends, for example, and coated stock tends to microfracture upon fabrication to produce a crazed film.

The maleic and fumaric dihydrocarbon esters, and monohydrocarbon monohydrogen half-esters employed as components of the copolymers typified by copolymers A and B are esters, within the cited classes, in which the radicals esterified by the maleic or fumaric acid are hydrocarbon radicals which contain from 1 to 10 carbon atoms and are saturated, i.e., free from ethylenic unsaturation although they may contain aromatic groups. On this basis, the diesters will contain from 6 to 24 carbon atoms, and the half-esters will contain from 5 to 14 carbon atoms. Suitable hydrocarbon groups include methyl groups, ethyl groups, normal- and iso-propyl groups, normal-, secondary and tertiary butyl groups, the several amyl groups, n-hexyl groups, cyclohexyl groups, 2-ethyl hexyl groups, phenyl groups, benzyl groups, naphthyl groups, and the like. Specific exemplary diesters include dimethyl maleate, dimethyl fumarate, diethyl maleate, di-n-butyl maleate, di-n-butyl fumarate, di-n-propyl maleate, diisopropyl maleate, diisobutyl maleate, di-secondary butyl maleate, di(2-ethyl hexyl) maleate, di(cyclohexyl) maleate, and di-benzyl maleate. Suitable half-esters include methyl hydrogen maleate, n-butyl hydrogen maleate, n-butyl hydrogen fumarate, n-propyl hydrogen maleate, benzyl hydrogen maleate, cyclohexyl hydrogen maleate, and the like. The esters used need not be pure compounds; thus mixtures of suitable dialkyl maleates and/or fumarates and mixtures of suitable monoalkyl monohydrogen maleates or fumarates may be used in lieu of pure esters of these respective types. A particularly useful combination of a specific dihydrocarbon ester and monohydrogen monohydrocarbon ester has been found to be the combination of (A) a commercial material offered as di-n-butyl maleate but actually containing approximately equal proportions of di-n-butyl maleate and di-n-butyl fumarate and (B) mono-n-butyl monohydrogen maleate.

As set forth hereinabove, there may be employed in the production of copolymers A and B any saturated halogenated hydrocarbons, preferably those containing from 1 to 4 carbons, examples of these being the halogenated methanes such as carbon tetrachloride, carbon tetrabromide, bromochlorodifluoromethane, bromoform, methyl chloride, methyl bromide, methyl iodide, chloroform, iodoform, methylene dichloride, methylene dibromide and the like, halogenated ethanes such as ethyl chloride, 1,1,2-trichloroethane, 1,1,2,2-tetrachloroethane, ethylene chloride, ethylene bromide, ethyl bromide, ethyl iodide, 1,1,2-trichloro-2-fluoroethane, 1,1,2-tribromoethane, 1,1-dichloro-2-bromoethane, pentachloroethane and the like, and halogenated propanes and butanes such as n-propyl chloride, n-propyl iodide, isopropyl chloride, isopropyl bromide, n-butyl chloride, 1,4-dichlorobutane, t-butyl chloride, and the like. Suitable halogenated hydrocarbons containing more than 4 carbon atoms include for instance amyl chloride, dodecyl bromide, dodecyl iodide, the dichloropentanes, hexadecyl chloride and the like. If it is desired to remove these materials at the close of the reaction, resort may be had to vacuum drying, steam distillation or methanol extraction. It will be understood that, instead of the pure halogenated hydrocarbons, mixtures containing two or more of the suitable compounds may be used.

Also, as set forth hereinabove, there may be employed in the production of copolymers A and B any halogenated ethylenically unsaturated hydrocarbon which is not readily copolymerizable with vinyl chloride. Vinyl chloride itself, vinyl bromide, vinyl fluoride, vinyl iodide, vinylidene chloride, vinylidene bromide, vinylidene iodide, vinylidene chlorobromide, vinylidene chloroiodide, vinylidene bromoiodide, vinylidene fluoroiodide, vinylidene fluorobromide, vinylidene fluorochloride, and trichloroethylene are thus to be excluded from the suitable unsaturated halohydrocarbons on this basis. Suitable unsaturated halogenated hydrocarbons other than those listed above as unsuitable will be seen to include for instance cis- and trans-1,2-dichloroethylene, cis- and trans-1,2 - dibromoethylene, tetrachloroethylene, tetrabromoethylene, 1,1-dichloro-2-bromoethylene, allyl chloride, methallyl chloride, allyl bromide, allyl iodide, methallyl bromide, methallyl iodide, 2,3-dichloro-1-propene, 3,3-dichloro-1-propene, 2,3-dibromo-1-propene, 1-chloro-2-butene, 1-chloro-2-decene, 1-chloro-2-octadecene, and the like. In general, it will be preferred to employ those unsaturated halogenated compounds containing from 1 to 4 carbon atoms, although higher molecular weight compounds may also be used. It will be understood that, instead of a single pure unsaturated halogenated hydrocarbon, there may be employed any mixture of such compounds which are individually suitable. If desired or necessary to remove the unsaturated halogenated compound at the completion of the polymerization, this can be done by means of vacuum drying, solvent extraction or the like.

In accordance with the invention, the copolymers typified by copolymer A are blended together with the copolymers typified by copolymer B in a weight ratio of from 98/2 to 25/75 and more preferably in a weight ratio of 95/5 to 50/50 and dissolved in a solvent medium containing at least 75% and preferably at least 90% by weight of liquid mononuclear aromatic hydrocarbon solvent, preferably toluene, to provide a concentrated solvent solution containing at least 18% resin solids and more preferably from 20–35% resin solids. These solutions, when deposited upon sheet metal stock and more particularly upon primed or unprimed tin plate and baked, provide films which adhere well and which also possess reasonably satisfactory resistance to blush under pasteurization conditions.

Further, in accordance with the invention, a significant improvement in blush resistance together with improved resistance to fabrication eliminating microfracturing of the coated film upon the production of can ends is achieved by the incorporation of from 2–15%, preferably from 3–10% by weight of total resin of higher fatty ester epoxide which is produced by the action of an epoxidizing agent on an unsaturated fatty ester of a polyhydric alcohol to produce an epoxide of unsaturated fatty acid esters such as the triglycerides of the unsaturated long chain fatty acids. Peracetic acid may be used as the expoxidation agent. The epoxide should have a 1,2 epoxy equivalency in excess of 1.0.

The unsaturated fatty acid esters which may be epoxidized to provide polyepoxides useful in the invention are preferably glyceride oils of the following acids or mixtures thereof:

Oleic (9-octadeconoic)
Linoleic (9,12-octadecadienoic)
Linolenic (9,12,15-octadecatrienoic)
Eleostearic (9,11,13-octadecatrienoic)
Licanic (4-keto-9,11,13-ocetadecatrienoic)
Ricinoleic (12-hydroxy-9-octadecenoic)
Erucic (13-docosenoic)

The unsaturated oil is charged to a reaction vessel and peracetic acid is then added gradually to the oil. The temperature at which the reaction mixture can be maintained may vary within the limits of −10° C. to 75° C. although it is preferred that the temperature be maintained in the range of 25° C. to 50° C. The reaction conditions are maintained until an analysis for peracetic acid indicates that substantially all of the peracetic acid charged to the reaction has been consumed or that the theoretically desired proportion of peracetic acid has been reacted. The reaction time will vary usually from two to eight hours depending, of course, on the temperature and the concentration of the peracetic acid in the reaction vessel.

The unsaturated fatty acid ester and peracetic acid are ordinarily employed in such a manner as to provide from 10 to 25 mol percent excess of peracetic acid in the reaction mixture but more or less peracetic acid can be employed and even an excess of the unsaturated ester may at times be employed, if desired.

The peracetic acid is usually added to the reaction vessel as a solution of peracetic acid in an inert solvent such as, for example, acetic acid and the like.

After the reaction period is over, the reaction solution is worked up by removing the solvent and any excess acid is removed in any convenient manner, such as by washing.

The preferred polyepoxide is specifically illustrated in the example which follows:

*Example I*

To 315 parts (0.33 mol) of soya bean oil heated to 30° C. were added 475 parts (1.5 mol) of peracetic acid solution containing 24% by weight of peracetic acid in acetic acid. The peracetic acid was added from a dropping funnel in a period of about 2 hours while stirring and temperature is controlled between 35–45° C. After addition the reaction mixture was heated at 35–40° C. for an additional 3 hours. The reaction mixture was then extractively distilled at reduced pressure (5 mm. Hg) in the presence of added ethylbenzene. The residue after extractive distillation contained 352 parts of epoxidized soya bean oil.

In accordance with the invention, coating is effected from a solvent solution in which the solvent is largely or preferably entirely constituted by liquid aromatic hydrocarbon solvent. Preferred aromatic solvents are mononuclear, such as benzene, toluene, xylene, ethylbenzene, and isomers and homologs thereof, these being useful either alone or in admixture with one another. Condensed aromatic solvents such as methyl naphthalene may also be employed either alone or in admixture with mononuclear aromatic hydrocarbons. Toluene is preferred.

While it is preferred to employ a solvent medium consisting of liquid aromatic hydrocarbon solvent, the invention includes the presence of small proportions not exceeding 25% and preferably not exceeding 10% by weight, based on the total weight of solvent, of more active solvents for vinyl resins.

Thus, minor amounts of an active polar solvent may be included in the solvent medium for the purpose of increasing the proportion of resin solids which may be dissolved or to decrease the viscosity of a solvent solution of a given resin solids content. Among the active polar solvents which may be used are various oxygen containing solvents, for example, ketones such as acetone, methyl ethyl ketone, methyl isobutyl ketone, cyclohexanone, ethyl butyl ketone, isophorone and diacetone alcohol; esters, such as ethyl acetate, n-butyl acetate, isobutyl acetate and butyl propionate; cyclic oxygen compounds, such as tetrahydrofuran, tetrahydropyran, dioxane and propylene carbonate; ether alcohols and esters thereof, such as 2-ethoxy ethanol and 2-ethoxyethyl acetate; nitrated organic compounds such as 2-nitropropane and nitrobenzene; amides, such as dimethyl formamide; and nitriles, such as acetonitrile.

The employment of active ketone and ester solvents such as those above referred to is not a necessary requirement for effectuating complete solution of the copolymer blends of the invention which may be dissolved in substantial proportion in mononuclear aromatic hydrocarbon solvent alone. However, the need for minor amounts of active polar solvent increases with the use of increasing proportions of copolymers typified by copolymer B, as well as with the formulation of solvent solutions of increasing resin solids content.

The coating compositions of the invention may be used on various metal surfaces but are preferably applied to tinplate which is desirably surfaced with a baked primer coating. The primer may be oil-soluble resinous varnish materials, or epoxy resin compositions (70 parts—Epon 1007) modified with urea-formaldehyde resin (25 parts) and alkaline-condensed phenol-formaldehyde resin (5 parts) or hydrocarbon primers prepared by copolymerizing 100 to 50 parts of butadiene-1,3 with 0 to 50 parts of styrene, desirably in the presence of finely divided metallic sodium in hydrocarbon diluent. Particularly suitable copolymers are those containing from 75 to 85 parts of butadiene copolymerized with 50 to 25 parts of styrene and these may be applied to the base either alone or in the presence of 5–40% of a reactive monomer such as styrene or vinyl toluene. Hydrocarbon primers of the type referred to are more fully disclosed in United States Patents 2,903,440, 2,908,585 and 2,586,594. Oil-soluble, heat-bodied, unsaturated, non-heat hardening, oil-modified resinous varnishes are preferred by reason of economy and availability.

Generally preferred primers are oleoresinous phenol-aldehyde varnishes which are normally prepared by heating phenol-aldehyde resin in a kettle with the unsaturated drying oil to dissolve the mixture and to body the mixture to the desired consistency after which it is thinned with solvent.

The drying oil constituent may include unsaturated drying oils such as fast drying oils having two or more conjugated double bonds per acid radical in the molecule, for example, China-wood oil, oiticica oil and dehydrated castor oil; medium drying oils having three or more non-conjugated double bonds per acid radical in the molecule, such as perilla oil, linseed oil, soya bean oil and the glycerides of the clupanodonic acid of fish oils; and semi-drying oils having two non-conjugated double bonds in an acid radical thereof such as poppyseed, rapeseed and sunflower seed oils.

When employing semi-drying oils, it is necessary to employ higher temperatures for heat-bodying, such as temperatures in the range of 400° F.–500° F. The mixture being heat-bodied is blanketed with an inert gas and the heat-bodying takes about 2 hours. The mixture must be carefully watched so that the cooking is stopped when the desired viscosity is reached.

Preferred phenolic varnish primers contain from 6 to 18, preferably from 12 to 15 gallons of oil per 100 pounds of resin.

Any oil-soluble, non-heat hardening phenol-aldehyde resin may be employed. By a non-heat hardening resin is meant that there are sufficiently few free methylol groups in the phenol-aldehyde condensate as to avoid substantial further condensation of the resin with itself during cooking with the oil.

Preferred phenol-aldehyde resins falling within the class specified are produced by reacting an aldehyde, preferably formaldehyde, with monohydric phenols, such as para tertiary butyl phenol in a mol ratio of aldehyde to phenol in the range of from 0.75/1 to 1/1 in aqueous solution medium in the presence of an acid catalyst such as phosphoric acid in an amount of 1% based on the weight of the phenol. Various oil-soluble, non-heat hardening phenol-aldehyde resins, including condensation products produced using a somewhat higher mol ratio of aldehyde to phenol and alkaline catalysis, are known to the art and these are also usable in accordance with the invention.

The phenolic constituent of the phenol-aldehyde resin may be phenol itself or it may be phenol substituted in the ortho and/or para position with an alkyl or aryl or aralkyl substituent. Thus, there may be used ortho or para cresol or mixed xylenols. The preferred phenolic constituent is illustrated by ortho or para cresol, para phenyl phenol or para tertiary butyl phenol. Para tertiary amyl phenol and para cyclohexyl phenol are also particularly desirable as the phenol constituent.

A preferred oleoresinous phenol-aldehyde varnish primary may be made as follows:

20 parts of oil-soluble para tertiary butyl phenol/formaldehyde resin and 20 parts of tung oil are mixed in an open varnish kettle and heated to 325° F. in about 15 minutes. The temperature is then raised to 380° F. and held for approximately 1.5 hours. The oleoresinous primer so produced is thinned with 60 parts of xylene and may be coated upon blackplate or tinplate and cured by baking for 10 minutes at 400° F.

A drier, such as lead, cobalt, calcium, or manganese, resinate and/or naphthenate, etc., may be introduced into the oleoresinous varnish before the coating operation, to exercise its effect during the baking. One-twentieth percent of cobalt as cobalt naphthenate may, for example, be added to the oleoresinous varnish based on the weight of the oil, to accelerate the curing of the oleoresinous component.

The oil-soluble para tertiary butyl phenol/formaldehyde resin referred to above was produced by condensing 1 mol of para tertiary butyl phenol with 0.9 mol of formaldehyde in water solution containing 1% by weight, based on the weight of the phenol, of 85% by weight aqueous phosphoric acid. The solution was maintained at reflux temperature for one hour to insure completion of the reaction. Water was then removed by vacuum distillation to provide a hard and friable resin.

A particularly valuable commercial oleoresinous primer of the non-phenolic type, but still falling within the category of oil-soluble, non-heat hardening resinous varnishes, which are heat bodied with an unsaturated drying oil comprises rosin which has been heat reacted with a small proportion of an alpha, beta-ethylenically unsaturated acid or anhydride such as maleic acid, maleic anhydride, citraconic acid or anhydride, itaconic acid or anhydride, etc., and with a polyhydric aliphatic alcohol, particularly glycerol. The modified rosin reaction product so produced is heat-bodied with the same type of unsaturated drying oils as have been previously referred to with respect to the phenolic primers.

The invention is illustrated in the examples which follow:

*Example II*

95 parts by weight of copolymer A and 5 parts by weight of copolymer B were dissolved in a 95/5 mixture of toluene and methyl ethyl ketone to provide a solution containing 22.2% of resin solids and this solution was applied to electrolytic tin plate and baked for 6 minutes at 300° F. to provide a baked film weighing 5 mg./sq. in., and also upon commercially primed electrolytic tin plate. The coated product possessed excellent dry adhesion and marginal satisfactory resistance to blush upon being subjected to water in both liquid and vapor forms for 45 minutes at 170° F. The coated plate was satisfactorily fabricated to produce can bodies, but crazed when deformed into the shape of a can end.

*Example III*

Example II was repeated with the addition of 5 parts of the epoxidized soya bean oil of Example I. Again, a sufficient proportion of a 95/5 mixture of toluene and methyl ethyl ketone was used to provide a solution containing 22.2% resin solids, this solution having a No. 4 Ford cup viscosity measured at 25° C. of 23 seconds. In comparison with the results produced in Example II, the solution of Example III was noticeably superior in blush resistance and did not craze when fabricated to form a can end.

*Example IV*

50 parts of copolymer A and 50 parts of copolymer B were blended together with 5 parts of epoxidized soya bean oil having an epoxy value of 0.373 equivalent per 100 grams and dissolved in a 85/15 mixture of toluene and methyl ethyl ketone to form a solution having a resin solids content of 22%. This solution had a No. 4 Ford cup viscosity measured at 25° C. of 25 seconds. The resulting products, using the solution of this example, were essentially the same as those obtained using the solution of Example III, the solution of Example III providing slightly superior resistance to blush and resistance to crazing upon fabrication into can ends.

The improved adhesion, resistance to blush and resistance to microfracturing (or crazing) upon fabrication obtained in the examples were also obtained when the solutions of Examples II, III, and IV were applied upon tinplate primed with commercial primers such as those described hereinbefore.

*Example V*

By substituting for copolymer B in Examples II–IV a corresponding weight of the various copolymers specified in Examples I, II and V of Reissue Patent 24,206 and in the example of Patents 2,849,422 and 2,849,423, substantially identical results are obtained.

*Example VI*

By substituting for copolymer A in Examples II–IV a corresponding weight of three modifications of copolymer A produced by conducting the emulsion polymerization in the presence of 2% by weight based on monomers of the chain terminating agents: (1) trichloroethylene, (2) 1,2-dichloroethylene and (3) tetrachloroethane, substantially identical results are obtained.

*Example VII*

Copolymer A in Examples II–IV was replaced by a corresponding weight of a similar copolymer produced using solution copolymerization in acetone in the presence of 1% of benzoyl peroxide based on total monomers and using diisobutyl fumarate in place of the commercial mixture of diesters used to produce copolymer A. Substantially identical results were obtained.

The invention is defined in the claims which follow.

I claim:

1. Coating compositions adapted for application to the interior of sanitary cans to provide adherent coatings resistant to elevated temperature pasteurizing treatments comprising a solvent medium comprising at least 75% by weight of liquid mononuclear aromatic hydrocarbon solvent and having dissolved therein at least 18% by weight of resin solids constituted by a mixture of copolymer components A and B in a weight ratio of copolymer component A to copolymer component B of from 98/2 to 25/75, copolymer component A being aromatic hydrocarbon-soluble copolymer of 55–75% of vinyl chloride with the balance of the copolymer consisting essentially of di-saturated hydrocarbon di-ester of acid selected from the group consisting of maleic, fumaric and chloromaleic acids and mixtures thereof, said di-esters containing 6–24 carbon atoms and said copolymer component A being characterized by complete solubility in toluene at 25% solids and by a relative viscosity measured at 20° C. in 1% cyclohexanone of from 1.3–1.7, and copolymer component B being aromatic hydrocarbon-soluble copolymer of 55–75% of vinyl chloride with 14–35% of di-saturated hydrocarbon di-ester of acid selected from the group consisting of maleic, fumaric and chloromaleic acids and mixtures thereof, said di-esters containing 6–24 carbon atoms and from 5–10% of monohydrogen mono-saturated hydrocarbon ester of acid selected from the group consisting of maleic, fumaric and chloromaleic acids and mixtures thereof, said mono-esters containing 5–14 carbon atoms and said copolymer component B being characterized by complete solubility in a 90/10 mixture of toluene and methyl ethyl ketone at 25% solids and by a relative viscosity measured at 20° C. in 1% solution in cyclohexanone of from 1.2–1.6.

2. Coating compositions as recited in claim 1 in which the weight ratio of copolymer components A and B is from 95/5 to 50/50.

3. Coating compositions as recited in claim 1 in which said mononuclear aromatic hydrocarbon solvent is toluene.

4. Coating compositions as recited in claim 3 in which said toluene is present in said solvent medium in an amount of at least 90%.

5. Coating compositions as recited in claim 3 in which said copolymer components A and B are dissolved in said solvent medium in an amount of from 20–35% by weight.

6. Coating compositions as recited in claim 1 in which said compositions include from 2–15% by weight based on total resin solids of an epoxidized triglyceride of unsaturated long chain fatty acid having a 1,2 epoxy equivalency in excess of 1.0.

7. Coating compositions as recited in claim 6 in which said epoxidized triglyceride is present in an amount of from 3–10% by weight.

8. Coating compositions as recited in claim 1 in which said solvent medium includes up to 25% of active polar solvent selected from the group consisting of acetone, methyl ethyl ketone, methyl isobutyl ketone, cyclohexanone, ethyl butyl ketone, isophorone, diacetone alcohol, ethyl acetate, n-butyl acetate, isobutyl acetate, butyl propionate, tetrahydrofuran, tetrahydropyran, dioxane, propylene carbonate, 2-ethoxy ethanol, 2-ethoxyethyl acetate, 2-nitropropane, nitrobenzene, dimethyl formamide and acetonitrile.

9. Tinplate surfaced with a baked film of the coating compositions recited in claim 1.

10. Primed tinplate surfaced with a baked film of the coating compositions recited in claim 1.

11. Tinplate surfaced with a baked oleoresinous phenol-aldehyde varnish primer and overcoated with a baked film of the coating compositions recited in claim 1.

12. A product as recited in claim 11 in which said oleoresinous phenol-aldehyde varnish is constituted by an oil-soluble, non-heat hardening phenol-aldehyde resin heat-bodied with from 6 to 18 gallons of drying oil per 100 pounds of said phenol-aldehyde resin.

13. Coating compositions adapted for application to the interior of sanitary cans to provide adherent coatings resistant to elevated temperature pasteurizing treatments comprising liquid mononuclear aromatic hydrocarbon solvent as essential solvating medium and having dissolved therein at least 18% by weight of resin solids constituted by a mixture of copolymer components A and B in a weight ratio of copolymer component A to copolymer component B of from 98/2 to 25/75, copolymer component A being aromatic hydrocarbon-soluble copolymer of 55–75% of vinyl chloride with the balance of the copolymer consisting essentially of di-saturated hydrocarbon di-ester of acid selected from the group consisting of maleic, fumaric and chloromaleic acids and mixtures thereof, said di-esters containing 6–24 carbon atoms and said copolymer component A being characterized by complete solubility in toluene at 25% solids and by a relative viscosity measured at 20° C. in 1% cyclohexanone of from 1.3–1.7, and copolymer component B being aromatic hydrocarbon-soluble copolymer of 55–75% of vinyl chloride with 14–35% of di-saturated hydrocarbon di-ester of acid selected from the group consisting of maleic, fumaric and chloromaleic acids and mixtures thereof, said di-esters containing 6–24 carbon atoms and from 5–10% of monohydrogen mono-saturated hydrocarbon ester of acid selected from the group consisting of maleic, fumaric and chloromaleic acids and mixtures thereof, said mono-esters containing 5–14 carbon atoms and said copolymer component B being characterized by complete solubility in a 90/10 mixture of toluene and methyl ethyl ketone at 25% solids and by a relative viscosity measured at 20° C. in 1% solution in cyclohexanone of from 1.2–1.6.

References Cited in the file of this patent
UNITED STATES PATENTS

| | | |
|---|---|---|
| Re. 24,702 | Gray et al. | Sept. 22, 1959 |
| 1,912,371 | Jacobson et al. | June 6, 1933 |
| 2,795,565 | Newey | June 11, 1957 |
| 2,849,422 | Rowland et al. | Aug. 26, 1958 |
| 2,849,423 | Rowland et al. | Aug. 26, 1958 |
| 2,849,424 | Rowland et al. | Aug. 26, 1958 |
| 2,925,403 | Shokal | Feb. 16, 1960 |
| 2,941,974 | Reymann et al. | June 21, 1960 |
| 2,949,383 | Blake | Aug. 16, 1960 |
| 2,951,769 | McKnight | Sept. 6, 1960 |
| 3,000,754 | Zentmyer | Sept. 19, 1961 |

Disclaimer 3,119,712.—*Edward J. Esswein, Jr.*, Pittsburgh, Pa. SANITARY CAN COATING COMPOSITION COMPRISING A BLEND OF VINYL CHLORIDE COPOLYMERS AND ARTICLE COATED THEREWITH. Patent dated Jan. 28, 1964. Disclaimer filed Aug. 7, 1967, by the assignee, *Mobil Oil Corporation*.

Hereby enters this disclaimer to claims 1 to 5 and 8 to 13 of said patent.

[*Official Gazette October 31, 1967*]